United States Patent
March

(10) Patent No.: US 6,490,506 B1
(45) Date of Patent: Dec. 3, 2002

(54) METHOD AND APPARATUS FOR MONITORING HYDROELECTRIC FACILITY MAINTENANCE AND ENVIRONMENTAL COSTS

(75) Inventor: Patrick A. March, Maryville, TN (US)

(73) Assignee: Hydro Resource Solutions LLC, Norris, TN (US)

( * ) Notice: Subject to any disclaimer, the term of this patent is extended or adjusted under 35 U.S.C. 154(b) by 0 days.

(21) Appl. No.: 09/316,687

(22) Filed: May 21, 1999

(51) Int. Cl.[7] ............................ G05D 3/12; G05D 5/00; G05D 9/00; G05D 11/00; G05D 17/00
(52) U.S. Cl. ...................... 700/286; 700/287; 700/290; 700/291; 700/292; 700/295; 700/22; 405/52; 405/80; 405/87; 405/92; 322/15; 322/17; 322/22; 322/23; 322/24; 322/37; 290/7; 290/43; 290/52; 290/53; 290/54
(58) Field of Search ................................ 700/282–287, 700/288, 290–292, 6, 22, 295; 119/215, 219, 220; 405/52, 18, 80–87, 92; 322/15–17, 22, 23, 24, 37, 99–100; 290/7, 43–44, 52–55, 40 R, 40 C

(56) References Cited

U.S. PATENT DOCUMENTS

| | | | |
|---|---|---|---|
| 3,932,735 A | | 1/1976 | Giras ..................... 235/151.21 |
| 4,057,714 A | * | 11/1977 | Fork et al. ..................... 702/34 |
| 4,075,699 A | | 2/1978 | Schneider et al. .......... 700/241 |
| 4,234,925 A | | 11/1980 | Kitano et al. ............... 700/286 |
| 4,319,320 A | | 3/1982 | Sato et al. ..................... 700/28 |
| 4,328,556 A | | 5/1982 | Abe et al. ..................... 200/28 |

(List continued on next page.)

FOREIGN PATENT DOCUMENTS

DE   2543587 B1  * 12/1976 ............ G07C/3/00

OTHER PUBLICATIONS

Daugherty, et al.. Fluid Mechanics with Engineering Applications, 8th Edition, McGraw–Hill, Inc. pp. 231–240, 1985.

*Primary Examiner*—Ramesh Patel
(74) *Attorney, Agent, or Firm*—Foley & Lardner

(57) ABSTRACT

A system for monitoring maintenance information in a hydroelectric power generation facility comprises sensors coupled to a controller. The sensors detect actual levels of operating parameters for a desired operating period at an operating condition. The detected parameters include a stressor capable of affecting a life span, or mean time between failures, of the turbine or one of its components. The controller determines the amount of the life span used up. A method for monitoring maintenance information in a power generation facility includes the steps of monitoring levels of operating parameters including a stressor for a desired operating period at an operating condition. The stressor affects the life span of the turbine or one of its components, and the amount of the life span used up over the operating period is calculated. A method for monitoring losses in a hydroelectric power generation facility operating to satisfy environmental constraints involves storing predetermined reference signals representative of desired turbine efficiencies over a range of operating levels in a memory circuit. Current levels of operating parameters are sensed while the facility is operating to satisfy the environmental constraints. A sensed parameter signal representative of a current turbine efficiency is generated from the sensed levels of operating parameters. The generated parameter signal is compared to the predetermined reference signals to determine an environmental efficiency loss signal.

27 Claims, 9 Drawing Sheets

U.S. PATENT DOCUMENTS

| | | | |
|---|---|---|---|
| 4,486,381 A | 12/1984 | Koji et al. | 376/210 |
| 4,683,718 A | 8/1987 | Larsson | 60/327 |
| 4,770,843 A | 9/1988 | Taleyarkhan | 376/216 |
| 4,772,157 A | 9/1988 | Obermeyer | 405/75 |
| 4,788,647 A | 11/1988 | McManus et al. | 700/286 |
| 4,794,544 A | 12/1988 | Albright et al. | 700/286 |
| 4,823,018 A | 4/1989 | Kuwabara et al. | 290/7 |
| 4,994,684 A | 2/1991 | Lauw et al. | 290/52 |
| 5,322,412 A | 6/1994 | Erlach | 415/1 |
| 5,347,446 A | 9/1994 | Iino et al. | 700/31 |
| 5,402,332 A | 3/1995 | Kopf | 700/28 |
| 5,754,446 A * | 5/1998 | Fisher, Jr. et al. | 700/287 |
| 5,800,077 A * | 9/1998 | March | 405/80 |
| 5,953,227 A * | 9/1999 | March et al. | 700/36 |
| 6,038,494 A * | 3/2000 | Fisher, Jr. et al. | 700/287 |
| 6,163,740 A * | 12/2000 | Beltracchi | 700/286 |
| 6,178,362 B1 * | 1/2001 | Woolard et al. | 700/286 |
| 6,259,972 B1 * | 7/2001 | Sumic et al. | 700/286 |
| 6,269,287 B1 * | 7/2001 | March | 700/286 |

\* cited by examiner

METHOD AND APPARATUS FOR MONITORING HYDROELECTRIC FACILITY MAINTENANCE AND ENVIRONMENTAL COSTS

FIELD OF THE INVENTION

The present invention relates generally to monitoring and control of the operation of a hydroelectric power generation facility. In particular, the invention relates to a technique for continuous evaluation of hydraulic performance costs and facility maintenance costs associated with operation of a turbine power generating installation in terms useful to operations, engineering and management personnel.

BACKGROUND OF THE INVENTION

Various control and monitoring systems have been proposed and are currently available for regulating operation of hydroelectric power production facilities. Such systems are typically dedicated to a particular facet of plant operation, or may more broadly group a number of control systems into a centralized control scheme. It is also known in the art of hydroelectric plant management to determine certain optimal or desired levels of operation, such as gate and blade positions of a Kaplan-type turbine, that are believed to be the best attainable levels for maximizing hydraulic efficiency given the plant technology, environmental constraints and so forth. However, it is also common that a particular facility may not be capable of continuously maintaining the desired levels of key operating parameters. For example, equipment and maintenance requirements, weather conditions, upstream and downstream water management schemes and many other constraints may restrict operation to other than the desired levels. In addition, operation at conditions other than those determined to provide the best hydraulic efficiency may be permitted to exist and continue due to a failure to appreciate the magnitude of the actual or opportunity costs of such operation.

While operations, engineering and management personnel may generally be aware in such situations that the facility is being operated at inefficient levels, except for commonly assigned and co-pending U.S. application Ser. No. 08/700,314, filed Aug. 18, 1996, heretofore known control systems have not provided sufficiently informative feedback relating to the actual performance costs of such operation. In particular, known hydroelectric plant control systems do not quantify inefficient hydraulic operation in economic terms that are readily meaningful to plant personnel. Consequently, correction of such inefficient operation may be delayed unnecessarily, causing the facility to incur unnecessary real or opportunity costs.

The above-identified U.S. application Ser. No. 08/700,314 discloses an improved system for monitoring and evaluating operation of a hydroelectric power generation facility by providing a realistic and continuous estimate of economic costs associated with operating the facility at other than the conditions desired for optimum hydraulic efficiency. The cost evaluation system is capable of comparing current operating conditions to predetermined or identified optimal conditions, and informing plant personnel in real-time of the economic costs of continued operation at current conditions. In addition, the monitoring system is capable of isolating the cost influence of various operating parameters independently, as well as tracking performance and accumulated performance costs, thereby allowing plant personnel to address particular facets of operation independently.

It is also generally known that operational efficiency can be affected by operating a turbine in a mode designed to satisfy environmental constraints. By way of example, hydroelectric power installations including features designed to satisfy environmental constraints by enhancing dissolved oxygen levels in the water flowing through the turbines are disclosed in U.S. Pat. Nos. 5,823,740 (issued Oct. 20, 1998), U.S. Pat. No. 5,879,130 (issued Mar. 09, 1999), and U.S. Pat. No. 5,896,657 (issued Apr. 27, 1999). Operating these turbines to enhance the dissolved oxygen level typically causes a loss of hydraulic efficiency in the facility, even though the turbines may each be operating with the gate opening and/or blade positions thought to provide optimal hydraulic efficiency. Although plant personnel may be aware that operation of the turbines to satisfy environmental constraints is resulting in hydraulic efficiency losses, the heretofore known control systems failed to provide sufficient information as to the cost of satisfying such environmental constraints in meaningful economic terms.

In addition to above-described increased operational costs resulting from hydraulic inefficiencies during turbine operation, another cost associated with turbine operation is maintenance cost. In general, turbine components as well as the turbines themselves have expected life spans that are shorter than the anticipated life span of the overall hydro installation, and thus such components and/or units must be periodically maintained and/or replaced. Rehabilitating or replacing turbine components or units typically involves substantial costs in term of both parts and labor as well as lost opportunity cost if the turbine must be shut down for the repair. This problem can be exacerbated if the turbine facility is operated under conditions that produce particularly severe stressors (e.g., excessive vibration or cavitation) known to adversely affect turbine components and result in excessive wear. That is, experience has shown that how the turbine is operated typically has a larger impact on the life of the turbine and its components than any other factor.

As with the heretofore known control systems for monitoring the costs of inefficient hydraulic operation, such control systems also have not provided plant personnel with sufficient information to know how much of the overall life of the turbine or its component is being "used up" or accelerated by operation under the current conditions, or the maintenance costs associated with such operation. Accordingly, correction of the conditions causing the stressful or undesirable operation may be delayed unnecessarily, causing the facility to incur real or opportunity costs due to costly, frequent or unnecessary maintenance.

Although theoretical in nature and not heretofore applied to the hydro turbine art, Rabinowicz et al. (1970) has applied a concept known as cumulative damage theory to accelerated life testing of mechanical and electromechanical systems including bearings, light bulbs, electric motors, and electric tools. Cumulative damage theory, which was originally developed in conjunction with fatigue testing of metals (Palmgren, 1924; Miner, 1945; Brook and Parry, 1969), holds that the life of a fatigue specimen, over a wide range of stresses, follows a relationship of this form:

$$\text{Life} = A\sigma^{(-B)} \qquad (1);$$

where A is a constant of proportionality, σ is the level of stress in the specimen under test, and B is a numerical constant. The results of Rabinowicz et al. suggest that cumulative damage theory is widely applicable to complex, real-world situations where the precise laws and mechanisms of deterioration are not explicitly known. The ability to evaluate the expected life of equipment under varying conditions would have enormous value in the hydro turbine art because it would allow the economic assessment and optimization of operational parameters and the cost-effective performance of condition-based, and operations-based, maintenance.

There is a need, therefore, for an improved system for monitoring and evaluating operation of a hydroelectric power generation facility that provides a realistic and continuous estimate of performance costs associated with operating the facility to satisfy environmental constraints. Moreover, there is a need for a monitoring system capable of estimating how much of the facility's or its components' expected life spans are being used up by continued operation under the current conditions, as well as the maintenance costs associated with such operation. Further, there is a need for a monitoring system capable of isolating the expected life and cost influences of various operating parameters independently, and of tracking present and accumulated life used up as well as maintenance costs associated with the various parameters, thereby allowing plant management to address particular facets of operation independently.

SUMMARY OF THE INVENTION

The present invention, featuring a novel technique for utilizing and presenting results from the continuous monitoring of operations for a hydroelectric power generating facility, is designed to respond to these needs. The technique may be adapted to new facilities or may be retrofitted to existing plants, typically without the need for downtime or additional instrumentation.

Thus, the invention features a method for monitoring maintenance-related information in a hydroelectric power generation facility including at least one turbine having turbine components. In accordance with the method, at least one operating parameter is monitored for a desired operating period at an operating condition. The at least one monitored parameter includes a stressor capable of affecting a life span, or mean time between failures, of the turbine or one of its components. In addition, the amount of the life span of the component or turbine used up over the operating period by operating at the operating condition subject to the stressor is calculated. The current, real-time value of the maintenance cost per unit time is also calculated.

The present invention also features a system for monitoring maintenance-related information in a hydroelectric power generation facility including at least one turbine having turbine components. The system comprises at least one sensor coupled to a controller. The at least one sensor is situated in the facility to detect actual levels of at least one operating parameter for a desired operating period at an operating condition. The at least one detected parameter includes a stressor capable of affecting a life span, or mean time between failures, of the turbine or one of its components. The controller is configured to determine the amount of the life span used up at the operating condition subject to the stressor for the operating period.

The invention also features a method for monitoring and evaluating losses in a hydroelectric power generation facility resulting from operating the facility to satisfy environmental constraints. In accordance with the method, a set of predetermined reference signals representative of desired turbine efficiencies over a range of operating levels are stored in a memory circuit. In addition, current levels of operating parameters are sensed while the facility is operating to satisfy the environmental constraints. A sensed parameter signal representative of a current turbine efficiency is then generated from the sensed levels of operating parameters. The generated parameter signal is compared to the predetermined reference signals to determine an environmental efficiency loss signal.

These and other benefits and features of the invention will be apparent upon consideration of the following detailed description of preferred embodiments thereof, presented in connection with the following drawings in which like reference numerals identify like elements throughout.

BRIEF DESCRIPTION OF THE DRAWINGS

The present invention will become more fully understood from the following detailed description, taken in conjunction with the accompanying drawings, wherein like reference numerals refer to like parts, in which.

DETAILED DESCRIPTION OF THE PREFERRED EMBODIMENTS

Figure 1:
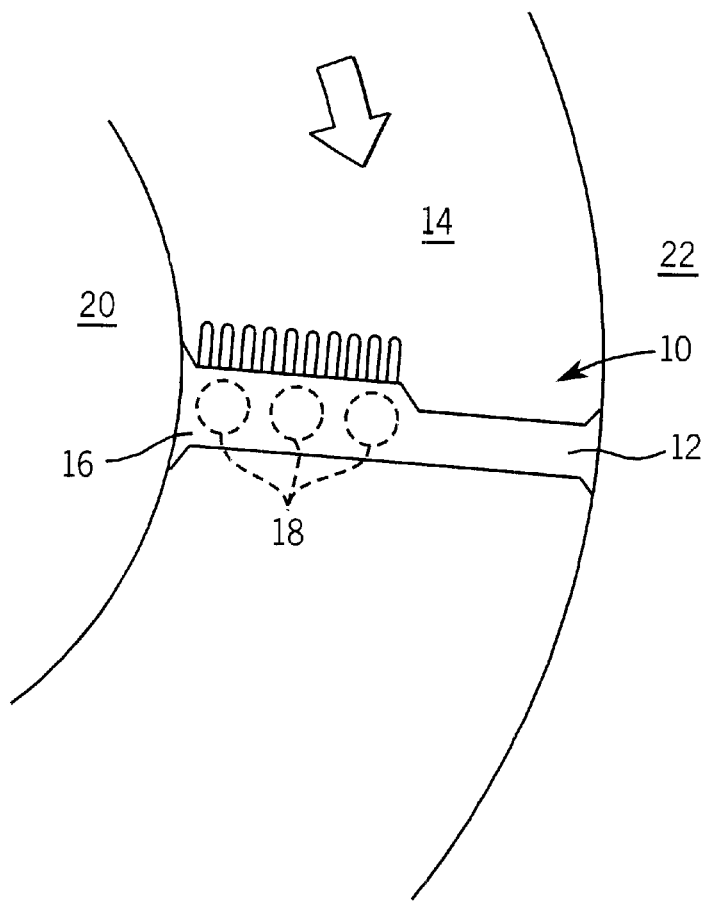
FIG. 1 is an exemplary perspective view of a turbine power generating facility including several turbine units across a section of a stream.

Turning now to the drawings and referring to FIG. 1, a hydroelectric power generating installation 10 is illustrated generally, including a dam 12 spanning a stream 14, and including a power generating facility 16. In the exemplary installation illustrated, facility 16 includes a series of three Kaplan-type turbine generating units, designated generally by the reference numeral 18. As will be understood by those skilled in the art, facility 16 may include more or fewer generating units 18, and such units may be situated adjacent to one or both banks 20, 22 of stream 14, or at various locations between the banks. Moreover, while the following discussion makes reference to a Kaplan turbine by way of example, the present invention is not limited to application with any particular type of turbine unit. In operation, facility 16 generates electrical power by permitting water to flow through turbine units 18, and outputs the generated power on a power distribution grid (not represented).

Figure 2:
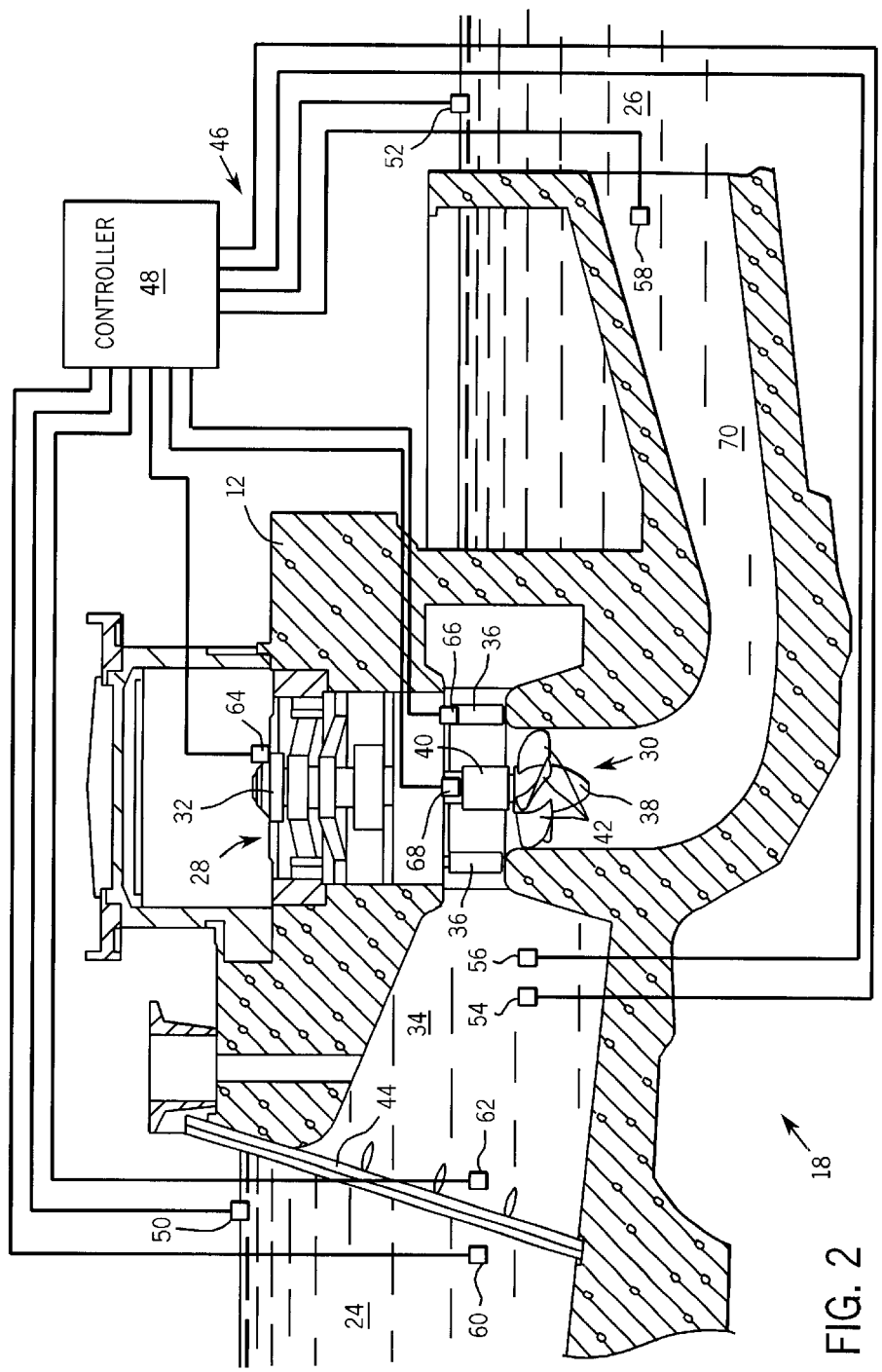
FIG. 2 is a diagrammatical representation of a Kaplan-type turbine installation illustrating exemplary instrumentation for monitoring and controlling operating parameters of the facility of FIG. 1 and for determining costs associated with operation of the facility over the full range of operating conditions, including other than optimal or desired conditions.

Each turbine unit 18 may be of generally known design, such as the vertical Kaplan turbine as illustrated diagrammatically in FIG. 2, for generating electrical power as water is allowed to flow through dam 12 from a headwater reservoir 24 of stream 14 to a tailwater side 26. Thus, unit 18 includes a turbine support superstructure 28 built within dam 12. Superstructure 28 provides axial and radial support for a turbine 30 and electrical generator 32. For the illustrated power generating unit, turbine 30 is positioned within the flow path of stream 14, downstream of an inlet conduit 34 and movable wicket gates 36. Turbine 30 includes a runner 38 supported on a vertical shaft 40 and having a plurality of movable blades 42 disposed around its periphery for driving shaft 40 and generator 32 in rotation as water flows through dam 12 from headwater 24 to tailwater 26. Unit 18 also includes a trash rack 44 upstream of inlet conduit 34, typically comprising parallel, spaced-apart bars, for preventing large objects and debris from fouling or damaging the wicket gates 36 and the turbine 30. A mechanical cleaning system may be provided atop superstructure 28 for removing debris accumulated upstream of trash rack 44. Alternatively, facility 16 may employ manual methods (e.g., rakes) for removing debris from trash rack 44 when required.

In the preferred embodiment illustrated in FIG. 2, unit 18 includes a control system, designated generally by the reference numeral 46, including number of sensors 50, 52, 54, 56, 58, 60, 62 and 64 and actuators 66 and 68 coupled to a controller 48 by appropriate data links. For the purpose of controlling operation of unit 18 and monitoring economic impact of operating facility 16 at levels other than predetermined reference levels, the sensors of control system 46 preferably permit detection of a set of operating parameters, including gross differential head from headwater 24 to tailwater 26, power generation level, flow through unit 18, cavitation, and trash rack head loss.

While a number of alternative methods are known in the art for directly or indirectly measuring the foregoing parameters, preferred sensing devices include the following. Appropriately placed stilling well-type transducers 50 and 52 measure the relative elevation or height of headwater 24 and tailwater 26, respectively. Such measurements are used to determine the drop in head across dam 12 and for determining the submersion factor ($\sigma$) of the turbine as an indication of the risk of cavitation within turbine 30. The submersion level is generally determined as a function of the difference between the tailwater elevation and a reference elevation for turbine 30 in a manner well known in the art. Sensor 54, positioned where feasible within inlet conduit 34, is a pressure transducer providing a signal proportional to the net head upstream of turbine 30, accounting for head losses between headwater 24 and wicket gates 36. Where unit 18 has a relatively short inlet conduit 34, sensor 54 may be situated near its entry. Reference numeral 56 represents a sensor assembly positioned within inlet conduit 34 for generating a signal indicative of flow (including density corrections) through unit 18. In the preferred embodiment, flow is determined by the well known Winter-Kennedy method, although alternative methods could be substituted, including the Peck method, the acoustic travel-time method, the acoustic scintillation method, etc. Sensor 58, provided in the draft tube 70 of unit 18, is a pressure transducer similar to sensor 54 generating a pressure measurement signal and isolating losses from turbine 30 to tailwater 26. Sensors 60 and 62 are pressure transducers generating pressure measurements on either side of trash rack 44, and providing an indication of head loss across trash rack 44. Alternatively, trash rack losses could be indicated by measurements of headwater level (e.g., from sensor 50) and inlet head (e.g., from sensor 54). Finally, reference numeral 64 represents a power monitor providing a continuous signal indicative of the level of power being generated by unit 18.

In addition to the sensors described above, control system 46 is typically provided with actuators for regulating physical characteristics of unit 18. By way of example, in the illustrated embodiment, Kaplan turbine actuator assemblies 66 and 68 are provided for orienting gates 36 and blades 42 at desired positions. Actuator assemblies 66 and 68 may be of any suitable type known in the art, such as assemblies including hydraulic cylinders or motors coupled to mechanical linkages for effectuating the desired movement of the gates and blades and for holding the gates and blades in the desired positions against the force of impinging flow through unit 18. Moreover, actuator assemblies 66 and 68 also include sensors, such as potentiometers, linear variable differential transformers or the like, for providing feedback signals indicative of the actual positions of gates 36 and blades 42.

Signals from the various sensors outlined above are applied to controller 48, which also serves to generate control signals for commanding actuator assemblies 66 and 68 to position gates 36 and blades 42 in desired orientations. More generally, controller 48 processes sensed parameter signals from the various sensors and controls various actuators to maintain operating levels in the facility in a manner generally known in the art. In the presently preferred embodiment, controller 48 includes an appropriately configured programmable logic controller executing a cyclic control routine stored in resident memory. Moreover, controller 48 is preferably also linked to other turbine units 18 within facility 16. Thus, where the other units 18 within facility 16 are comparably instrumented, controller 48 receives signals indicative of the operating parameters of all units 18 in facility 16, and controls operation of actuators for all such units.

In the presently preferred embodiment, controller 48 stores reference levels for certain key operating parameters of interest and compares these reference levels to current, actual levels for the respective parameters to determine deviations from the reference levels as described more fully below. In general, such reference levels will include parameters such as power generation efficiency for the current head and flow rate levels, cavitation levels, trash rack losses and the like. The particular parameters monitored by controller 48 may vary from facility to facility in accordance with the needs of operations, engineering and management personnel. However, the monitored parameters are preferably limited to those having an economic impact on operation of the facility. Moreover, it should be understood that the reference levels referred to herein may be established by a variety of methods known in the art. For example, a number of methods are known for establishing optimal gate and blade settings for a Kaplan-type turbine, such as the method disclosed in U.S. Pat. No. 5,402,332, issued to Kopf on Mar. 28, 1995, and hereby incorporated into the present disclosure by reference. Similarly, it is generally known in the art to establish optimal or desired levels of cavitation, typically sensed by acoustic devices positioned within the flow conduit from the turbine, that least adversely impact power production. By way of example, the following discussion presents the present technique as applied to analysis of trash rack losses. As will be appreciated by those skilled in the art, however, techniques for analysis of the economic impact of trash rack losses discussed below are equally applicable to analysis of other relevant operating parameters capable of influencing economic productivity of the hydroelectric facility.

For the particular purpose of monitoring losses across trash rack 44, facility 16 is preferably instrumented as follows. When the structure of facility 16 permits, it is preferred to measure differential head across trash rack 44 via sensors 60 and 62 located as closely adjacent to trash rack 44 as possible to isolate the effects of other (i.e., non-trash rack) losses. In some facilities, however, it may be acceptable or necessary to base estimates of trash rack losses on headwater level (as measured by sensor 50) and on an output of a suitable piezometer positioned within inlet conduit 34. Ultimately, however, when the present technique and system are retrofitted to existing facilities, the particular instrumentation options may be limited by the facility design. In general, trash rack monitoring as described below requires some form of instrumentation for detecting pressure drop across trash rack 44 and flow through inlet conduit 34.

Figure 3:
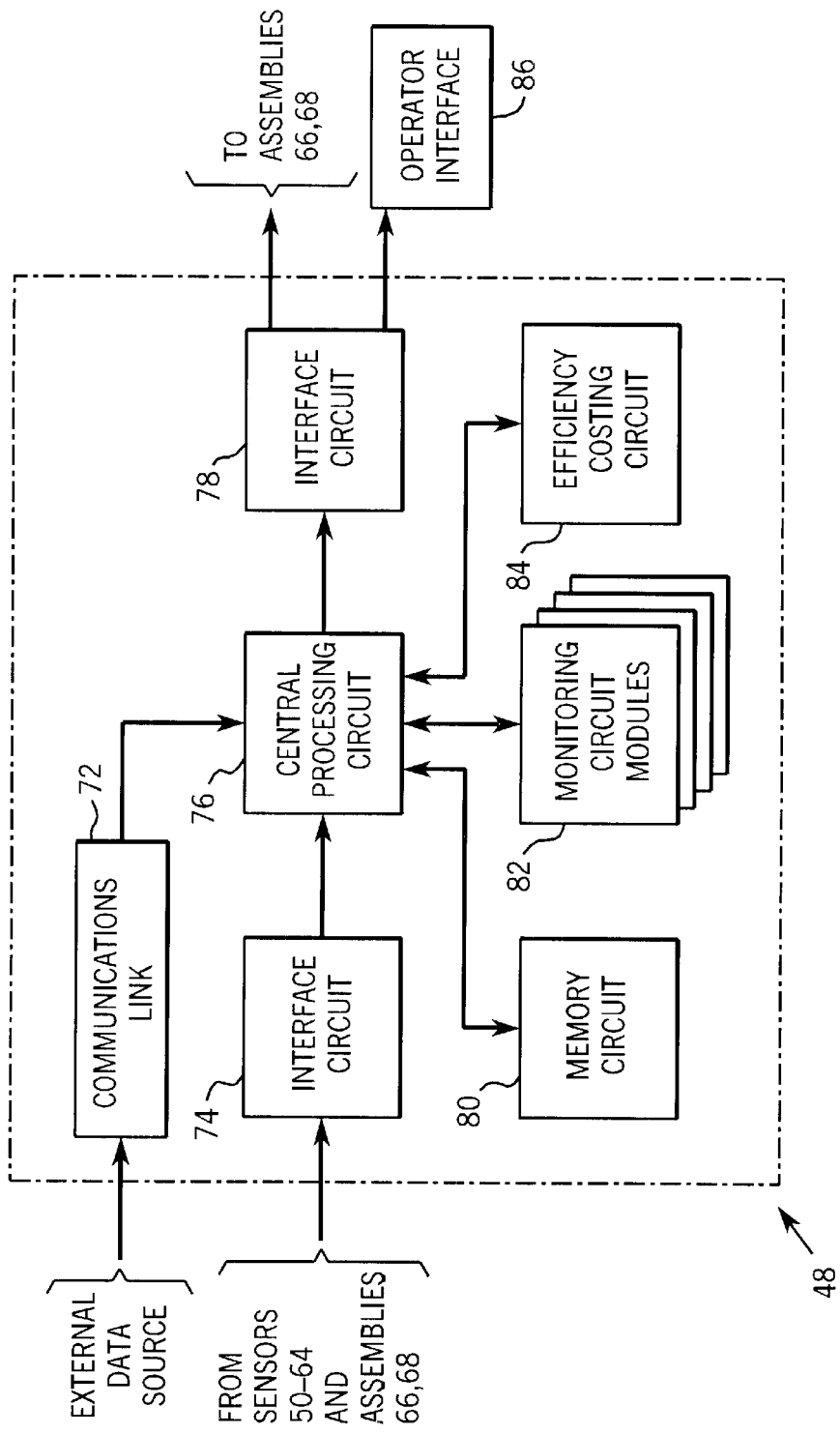
FIG. 3 is a block diagram of certain of the functional circuits in the control system illustrated in FIG. 2 for monitoring the facility operating parameters and determining cost estimates.

FIG. 3 is a general block diagram of certain functional circuits included in controller 48 when programmed to execute a hydraulic efficiency economic impact analysis technique as described below. Controller 48 includes a communications link 72, an interface circuit 74, a central processing circuit 76, an interface circuit 78, a memory circuit 80, a plurality of monitoring circuit modules 82, and an efficiency costing circuit 84. Communications link 72 preferably includes a fiber optic-based wide area network, but may instead include a high speed modem or other telecommunications device. Regardless of its form, communications link 72 provides central processing circuit 76 with data from an external data source, such as an on-line source of current energy prices, for use in economic impact calculations described below. Interface circuit 74, which typically includes appropriate multiplexing, analog-to-digital converting and signal conditioning circuitry, receives operating parameter signals from sensors 50–64 and feedback signals from actuator assemblies 66 and 68, and applies these signals to central processing circuit 76. Similarly, interface circuit 78, which typically includes appropriate signal conditioning circuitry, receives control signals from central processing circuit 76 and commands corresponding servo movement of actuators within facility 16, such as actuator assemblies 66 and 68 for controlling orientation of gates 36 and blades 42. Moreover, interface circuit 78 communicates control signals from central processing circuit 76 to an operator interface 86 for displaying operating conditions, such as the head loss across trash rack 44 or cost values associated with current trash rack losses or other operating parameters. Operator interface 86, which typically includes a computer monitor situated in a control station (not shown) for facility 16, may also display or sound visual or audible alarms, such as when trash rack losses exceed predetermined threshold levels as described below.

Central processing circuit 76 is also linked to memory circuit 80, monitoring circuit modules 82 and costing circuit 84. Depending upon the particular need of facility 16, monitoring circuit modules 82 may include a trash rack monitoring circuit module as described below, an efficiency module, a cavitation module, or any other similar routine for monitoring and evaluating operating parameters capable of affecting hydraulic performance of facility 16. In operation, central processing circuit 76 executes a cyclical control routine stored within memory circuit 80 for controlling operation of facility 16. Monitoring circuit modules 82 analyze parameter values accessed in the control routine to determine variations from reference values stored in memory circuit 80. Based upon the monitored values, costing circuit 84 executes calculations of the economic impact of operation of facility 16 at the monitored conditions.

As will be appreciated by those skilled in the art, the functional circuitry represented in FIG. 3 may be defined by standard input/output circuitry, memory circuitry and programming code in a standard programmable logic controller, personal computer, computer workstation or the like. For example, in the presently preferred embodiment, central processing circuit 76, in the form of a programmable logic controller dedicated to facility 16, is provided with resident memory for executing a main control routine. Monitoring circuit modules 82 and costing circuit 84 are preferably portions of the main control routine, or may comprise separate software modules retrofitted to the main control routine.

Application of the present technique to analysis of the economic impact of trash rack hydraulic performance losses will now be described. In accordance with a preferred embodiment, controller 48 calculates hydraulic losses across trash rack 44 as follows. When sensors 60 and 62 are available in facility 16 for detecting parameters representative of the pressure differential across trash rack 44, trash rack monitoring circuit 80 calculates a trash rack head loss parameter or coefficient in accordance with the relationship:

$$K_T = 2g(A_T)^2(H_1 - H_2)/Q^2 \qquad (2);$$

where $K_T$ is the trash rack loss parameter, g is a gravitational constant, $A_T$ is an intake flow area for the trash rack, $H_1$ is the head immediately upstream from the trash rack, $H_2$ is the head immediately downstream from the trash rack and Q is intake volumetric flow rate. Referring to the diagrammatical view of FIG. 2, the intake flow area utilized in equation (2) will be known for facility 16 and generally corresponds to the cross sectional area of the inlet conduit at the location of sensor 62. As mentioned above, the flow rate through the inlet conduit may be calculated in a variety of known ways, such as the Winter-Kennedy method.

When facility 16 includes net head taps or other suitable piezometer instrumentation in inlet conduit 34 downstream of trash rack 44, the trash rack head loss coefficient may be calculated using the headwater elevation as detected by sensor 50, in accordance with the relationship:

$$K_T = 2g(A_T/Q)^2(HW - H_3) - (A_T/A_1)^2(1 + K_1) \quad (3);$$

where HW is the headwater elevation, $A_1$ is the inlet conduit flow area at the location of the head tap or piezometer, $H_3$ is the piezometric head in the inlet conduit and $K_1$ is an intake loss coefficient representative of losses between a point adjacent to the trash rack (e.g., the location of sensor 62) and the location of the piezometer. The latter coefficient is preferably measured for the particular installation or may be predicted analytically in a manner known by those skilled in the art.

The resulting trash rack loss coefficients provide an indication of head loss across trash rack 44 independent of flow through the trash rack. Trash rack monitoring circuit module 82 preferably determines the trash rack coefficient periodically and communicates the resulting coefficient to circuit 76 for storage in memory circuit 80. By accessing historical trash rack coefficients thus stored in memory circuit 80, circuit 76 may output trending values to operator interface 86, such as for graphically displaying losses due to trash buildup over time. Moreover, trash rack monitoring circuit module 82 preferably generates a reference trash rack loss coefficient when trash rack 44 is clean. Subsequently, by comparing current coefficient values to the reference clean value, controller 48 preferably determines a difference value associated with additional head loss across the trash rack due to fouling.

The difference value is communicated to costing circuit 84, which applies an economic impact factor to the value to determine the economic impact of operation at the current trash rack fouling level rather than with the trash rack clean. The economic impact factor is preferably a unitized energy cost and may be assumed from past performance and stored in memory circuit 80, or may be accessed from an on-line source through communications link 72. For the example of the trash rack loss analysis discussed above, the economic impact value R is preferably generated in accordance with the relationship:

$$R = [(K_T - K_C)(Q/A_T)^2 PE]/[2g(HW - TW)_{avg}] \quad (4);$$

where $K_C$ is an intake loss coefficient for the trash rack when clean (reference value), P is the average annual energy production for the facility, E is an economic energy unit cost, and $(HW-TW)_{avg}$ is the average gross head for the facility. In general, the average annual energy production and average gross head will be known for facility 16. As mentioned above, the economic energy unit cost value may be assumed at an average level for the facility, or may be accessed from an external data source, such as a utility, through communications link 72. In the latter case, economic impact value R will generally reflect the actual cost at the current energy value. Where costs are subsequently accumulated over time, such as by summing or integrating the economic impact value, such accumulated costs will reflect both the changes in operating conditions (e.g., degradation in performance) as well as any changes in energy costs.

By periodically calculating this cost value and storing successive values in memory circuit 80, controller 48 may display trending plots for current and accumulated costs of trash rack fouling on operator interface 86. Controller 48 preferably accumulates similar data for other operating parameters, such as plant efficiency, cavitation and the like as analyzed by other monitoring circuit modules 82 and costing circuit 84. Any or all of these cost estimates may be combined or displayed individually on operator interface 86. As will be appreciated by those skilled in the art, such information may be used by operations, engineering and management personnel as systems diagnostics tools, to improve operation of facility 16, to analyze economic performance, to schedule plant maintenance or for any other suitable purpose. For example, it has been estimated that for a specific 5-unit 175 MW run-of-the-river hydro plant, trash rack losses of one foot represent an annual revenue loss of $500,000, assuming an energy value of $25/MWh. Thus, when the cost value for the trash rack losses exceeds a predetermined acceptable level, plant personnel may opt to clean the rack, operate a previously installed automatic cleaning system, or take other remedial measures. Moreover, although the reference levels described above are preferably known optimal or desired operating levels for existing plant equipment, the present technique may be employed using assumed reference levels for improved plant systems. Results of the economic impact analyses described above could then be used as a predictive tool for anticipating potential payback periods, improved performance and the like.

Figure 4:
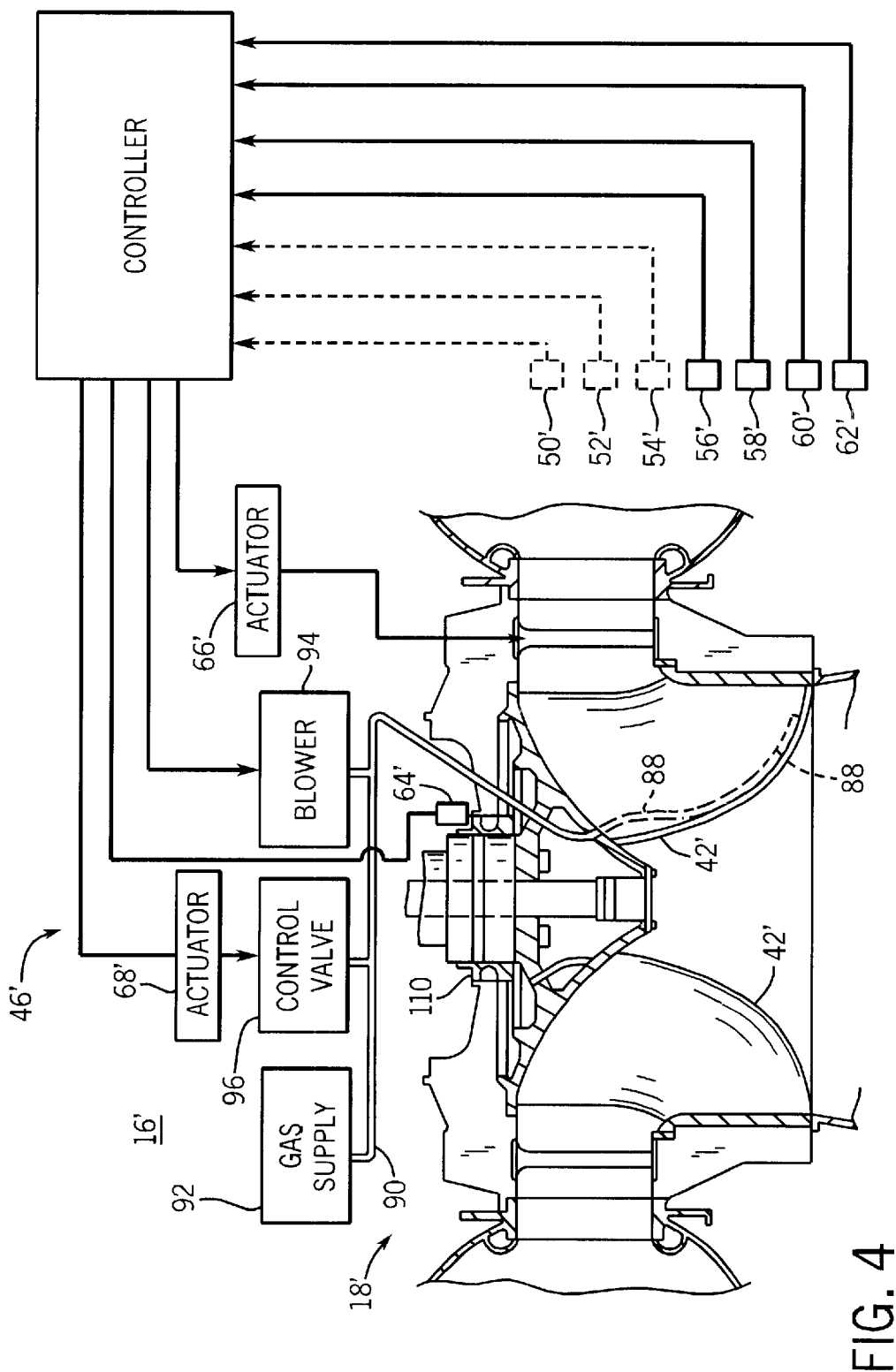
FIG. 4 is a diagrammatical representation of a Francis-type turbine illustrating exemplary instrumentation for monitoring and controlling operating parameters and for determining costs associated with operation of turbine facility to satisfy environmental constraints as well as the impact of turbine operation on life expectancy and maintenance costs.

Turning now to FIG. 4, application of the present technique to analysis of the economic impact of operating a power generating facility 16' to satisfy environmental constraints will now be described. For sake of brevity, components in the turbine of FIG. 4 having functions similar to those of corresponding components in the turbine of FIG. 2 will be designated by identical reference numerals, but primed. In addition, while the following discussion makes reference to a Francis turbine by way of example, the present invention is not limited to application with any particular type of turbine unit.

Turbine facility 16', as an example, includes three identical Francis turbine units 18' and an integrated a control system 46'. As can be seen, each turbine 18' differs from a conventional Francis turbine in that it includes modifications for enhancing the dissolved oxygen content in the water passing through the turbine. Specifically, turbine 18' includes fixed blades 42' provided with gas passages 88 connected via a passageway 90 to a gas supply 92, a compressor or high volume blower 94 for facilitating the gas flow through passageway 90, and one or more control valves 96 for controlling the gas flow. Further details of such a turbine adapted for enhancing dissolved oxygen level in the discharge water is disclosed in co-pending U.S. application Ser. 08/733,366, filed Oct. 17, 1996, the entire contents of which are hereby incorporated by reference. Although the oxygen containing gas is shown as being provided to the blade trailing edges, one skilled in the art will recognize that the gas could alternatively or in addition be provided to the region intermediate the rotating runner band and the surrounding stationary discharge ring, the region intermediate the rotating runner crown and stationary head cover, and/or a region in the draft tube downstream of the runner. Moreover, the oxygen containing gas could be routed through gas supply lines in the concrete foundation to any or all of these locations rather than through the rotating runner.

Control system 46' includes a plurality of sensors 50'-64' and actuators 66' and 68' coupled to a controller 48' by appropriate data links. Sensors 50'-64' are designed to measure parameters in Francis turbine unit 18' similar to those described above with reference to the various sensors of control system 46 in Kaplan turbine unit 18. Thus, sensors 50'-64' monitor parameters such as turbine speed, power output, wicket gate position, head water elevation, tail water elevation, head losses, and cavitation, and any other operating parameters that may impact hydraulic efficiency. In addition, sensors 50'–64' monitor parameters or stressors such as vibration level, cavitation intensity, bearing oil quality and quantity, bearing loading and temperature, measured mechanical stresses, inefficiency parameters, and any other operating parameters that may affect the life expectancy of the turbine or its components. Additionally, sensors 50'–64' monitor parameters specific to dissolved oxygen enhancement such as water temperature and dissolved oxygen level in the head and tail water, and oxygen-containing gas flow rate, among others. Finally, actuators 66' and 68' for controlling the positions of wicket gates 36' and control valve(s) 96, respectively, include sensors for providing feedback signals indicative of the actual positions of gates 36' and control valve(s) 96.

Figure 5:
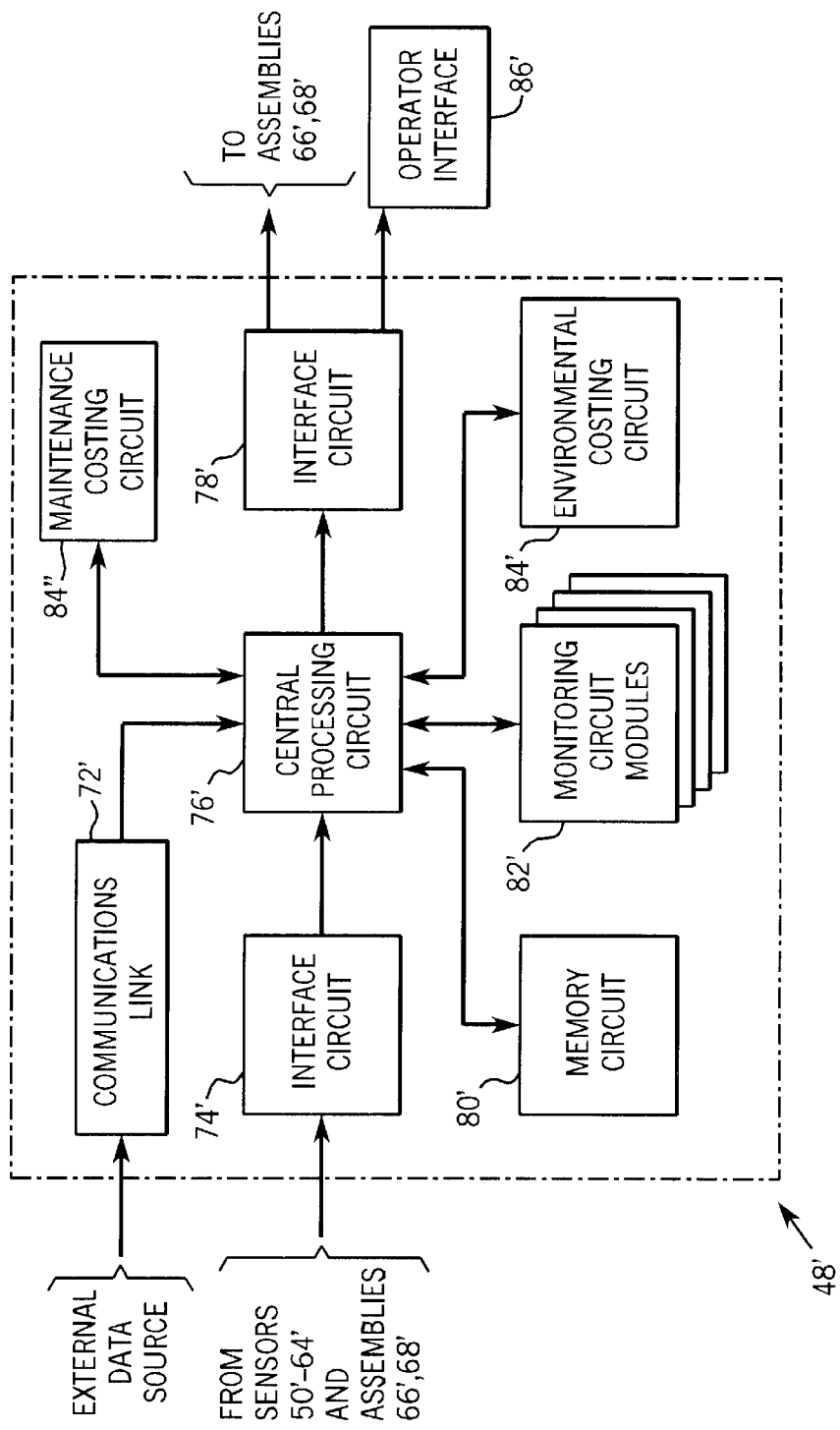
FIG. 5 is a block diagram of certain of the functional circuits in the control system illustrated in FIG. 4 for monitoring the facility operating parameters and determining cost estimates for satisfying environmental constraints as well as impact on life expectancy and maintenance costs.

FIG. 5 is a general block diagram of certain functional circuits included in controller 48' when programmed to execute an environmental economic impact analysis technique as described below as well as a life expectancy and maintenance economic impact analysis technique as described below. Controller 48', like controller 48, includes elements such as a communications link 72', an interface circuit 74', a central processing circuit 76', an interface circuit 78', a memory circuit 80', a plurality of monitoring circuit modules 82', and an environmental costing circuit 84'. In addition, controller 48' also includes a maintenance costing circuit 84" as described in detail further below. The information provided by the various sensors 50'–64' is used by controller 48' to compute and generate various control signals, as required, for controlling the amount of oxygen containing gas flowing through passageway 90 to enhance the dissolved oxygen level of water passing through turbine 18'.

Figure 6:
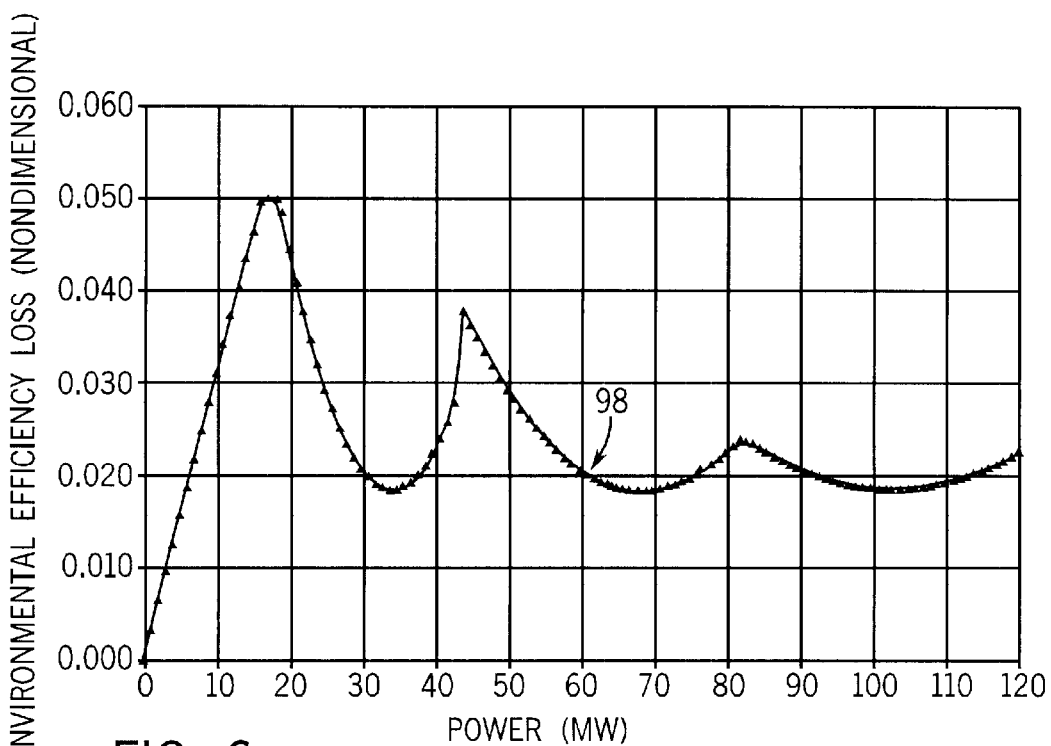
FIG. 6 is a graph showing a typical loss of hydraulic efficiency resulting from operating a three unit turbine facility, such as the one shown in FIG. 4, to satisfy environmental constraints.

Operation of a turbine installation such as facility 16' to satisfy environmental constraints (e.g., dissolved oxygen enhancement) will typically cause a loss of hydraulic efficiency. The graph in FIG. 6 shows a curve 98 that plots environmental efficiency loss (Y-axis) verses power (X-axis) for a three-unit turbine plant such as facility 16' over the entire operating range (i.e., 0–120 MW) while turbines 18' operate to increase dissolved oxygen. Curve 98 can of course be computed by comparing the actual hydraulic efficiency levels of turbine 18' over its entire operating range while operating to enhance the dissolved oxygen level, against the predetermined efficiency levels of turbine 18' over its entire operating range during "normal" operation, i.e., without operating to satisfy environmental constraints. Such predetermined turbine efficiency levels for "normal" operation can be derived either by actual operation of turbine 18' with the features for enhancing dissolved oxygen either deactivated or entirely missing, by computations based on physical model testing, or by computations based on numerical models. As will be understood by those skilled in the art, turbine efficiency can be affected by a number of operating parameters, but in general can be computed based on power generation level, flow rate (including density effects) through the unit, and head across the unit.

Figure 7:
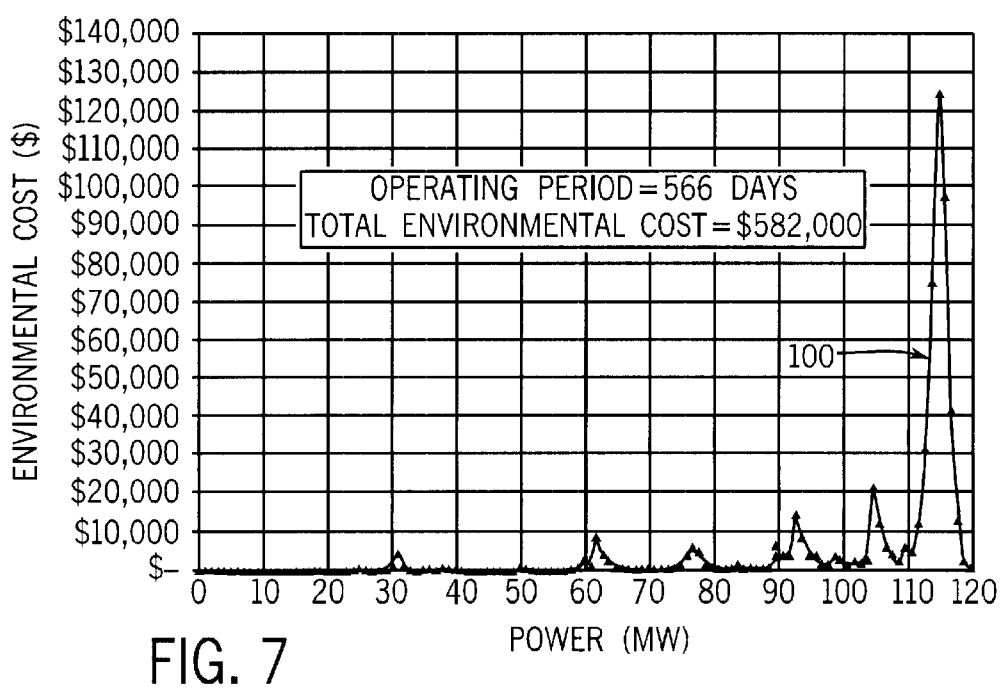
FIG. 7 is a graph showing a computation of costs for environmental efficiency losses resulting from operating the three unit turbine facility of FIG. 4 over a 566 day operating period to satisfy environmental constraints under varying operating conditions.

At each operating condition (power level), costing circuit 84' executes calculations of the costs associated with the environmental efficiency losses over a desired operating period as the product of the power level, the number of hours of operation at the power level, the environmental efficiency loss at that power level, and the dollar value of energy ($/MWh). These computed environmental costs are summarized in FIG. 7 by a line 100 which extends over the operating range (i.e., 0–120 MW) of turbine facility 16' for an exemplary operating period (i.e., 566 days in this example). As can be seen, the area below line 100 represents the total environmental costs (i.e., $582,000 in this example) for operating facility 16' to increase the dissolved oxygen level for the entire 566 day period, with the environmental costs primarily occurring in the economically attractive operating range between 110 MW and 120 MW.

Application of the present technique to analysis of the life expectancy and economic impact of turbine guide bearing ("TGB") vibrations will now be described. In accordance with a preferred embodiment, maintenance costing circuit 84" of controller 48' utilizes and expands upon the cumulative damage approach taken by Rabinowicz et al. for accelerated life testing to calculate what fraction of the life of a component or turbine has been used up, as well as the associated maintenance cost.

Turning first to the general application of cumulative damage theory to hydroelectric generating equipment, the "life expectancy," or mean time between failures, for a hydroelectric generating unit or one of its components is assumed to follow the relationship:

$$L = \alpha S^{(-\beta)} \tag{5}$$

where L is the life expectancy of the unit or component under consideration, $\alpha$ is a constant of proportionality, S is the generalized "stress" encountered in the operating environment of the equipment, and the exponent $\beta$ is a numerical constant. By way of example and not limitation, typical "stressors" that may be encountered in the operating environment of turbine equipment include vibration level, cavitation intensity, seal clearance or leakage, an inefficiency parameter, a measured mechanical stress, a calculated mechanical stress, bearing oil quality and quantity, bearing loading, bearing temperature, and the like. For example, leakages due to seal clearances may influence stability of the turbine and reduce the operating efficiency. Mechanical vibrations tend to reduce the useful life of mechanical components and linkages, such as bearings and bushings, leading to costly down time for maintenance and component replacement. Excessive guide bearing temperatures may be caused by side loading and may be indicative of overloading that will eventually lead to the need to replace the bearings. In the same way, excessive cavitation levels are indicative of operation at levels that will lead to the need for cavitation repair of the turbine and reduced equipment life. All of these factors may potentially reduce efficiency of the unit or accelerate costly maintenance or even component failure. Sensors 50'–64' can be configured to monitor any or all of these stressors, as desired, as well as to monitor any other stressor capable of impacting the life expectancy of a turbine component or the entire turbine.

Figure 8:
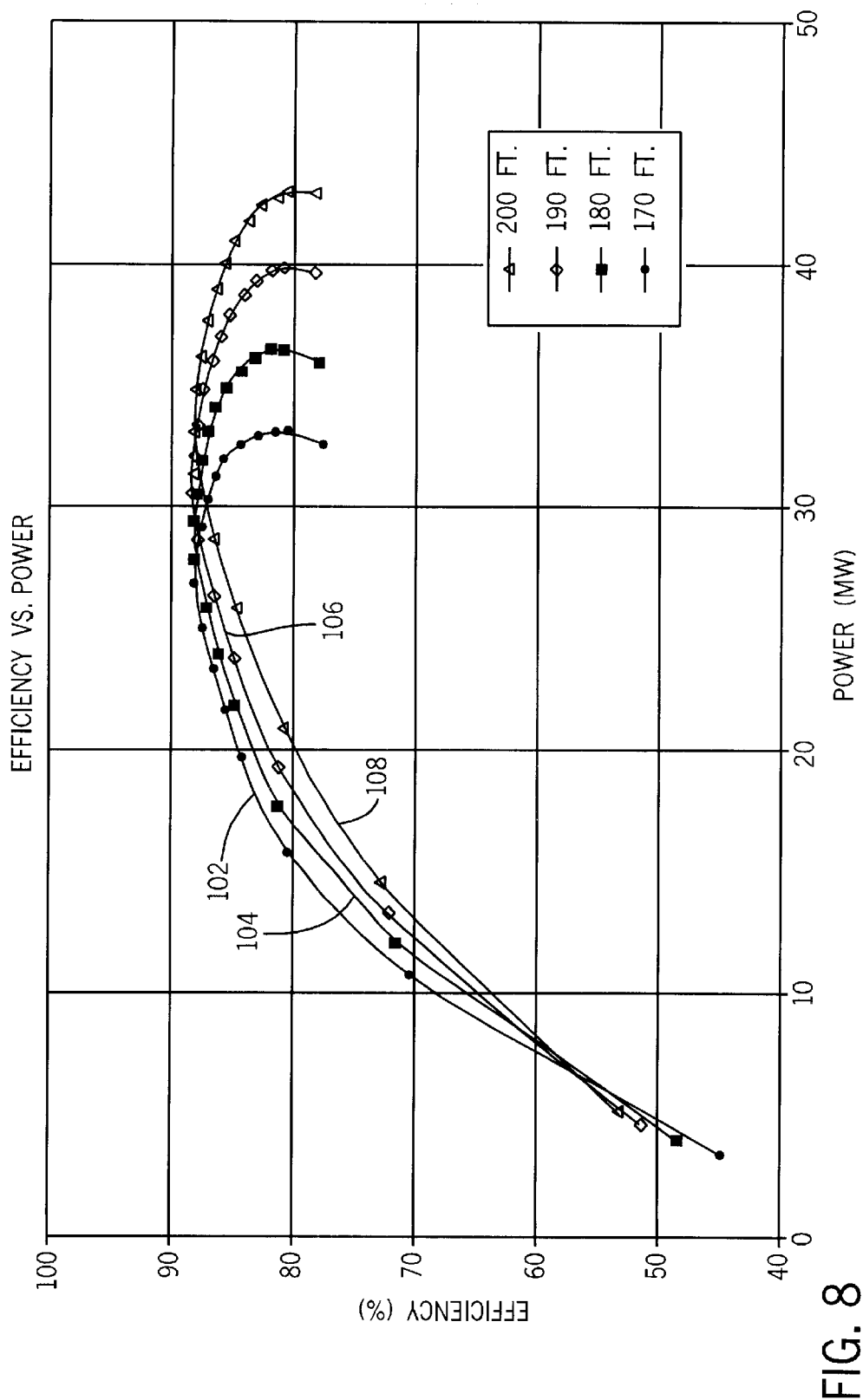
FIG. 8 is a graph showing a series of curves representing hydraulic efficiency as a function of gate opening or output power for a series of heads representing an expected operating range for a typical turbine, such as the one shown in FIG. 4.

Hydraulic performance for a hydroelectric unit such as unit 18' is typically characterized by a series of curves showing hydraulic efficiency as a function of gate opening or output power for a series of heads representing the expected operating range. This convention is adopted here. Accordingly, FIG. 8 shows a typical series of such curves 102, 104, 106, and 108 for unit 18' of facility 16'. In the more general case of a hydro turbine unit or component operating under a variety of "environmental stressors," $S_{ij}$, then:

$$L_{ij} = \alpha_{ij} S_{ij}^{(-\beta_{ij})} \tag{6}$$

where $L_{ij}$ is the life expectancy of the component or unit if operation were to continue to failure under stressor $S_i$ (e.g., vibration or cavitation level) at operating condition j (e.g., head and power), and $\alpha_{ij}$ and $\beta_{ij}$ are the proportionality constant and the exponent, respectively, for stressor $S_i$ at operating condition j. The data representative of the exemplary performance curves 102–108 can be readily stored in, accessed from, and interpolated from an N-dimensional array, along with other data representative of additional operating parameters or stressor of interest, where N is the total number of operating parameters and stressors. More detailed background on the procedure for storing and accessing such information in combination with flow curves is provided in U.S. Pat. No. 5,754,446, issued to Fisher et al. on May 19, 1998 and hereby incorporated into the present disclosure by reference.

Assuming that the component or unit operates for a time $t_{ij}$ under the effects of stressor $S_i$ at operating condition j, then the fraction of its life, $l_{ij}$, at these conditions can be defined as the ratio of the operating time $t_{ij}$ to the expected life under that stressor, $L_{ij}$:

$$l_{ij}=t_{ij}/L_{ij} \qquad (7).$$

Another useful definition from cumulative damage theory is that the following relationship must hold at failure:

$$\Sigma l_{ij}=1 \qquad (8).$$

That is, the life of the component is by definition "used up" by the summation of effects from the environmental stressors. This theoretical relationship is supported by experimental data from the accelerated fatigue testing research of Rabinowicz et al. Thus, at some time before failure, the remaining life R can be expressed in non-dimensional terms as follows:

$$R=(1-\Sigma l_{ij}) \qquad (9);$$

and when expressed as a percentage, equation (9) becomes:

$$R(\text{in } \%)=100(1-\Sigma l_{ij}) \qquad (10).$$

When equations (7) and then (6) are sequentially substituted into equation (10), this expression becomes:

$$R(\text{in } \%)=100(1-\Sigma(t_{ij}/L_{ij})) \qquad (11); \text{ and}$$

$$R(\text{in } \%)=100(1\Sigma(t_{ij}/\alpha_{ij}S_{ij}^{(-\beta_{ij})})) \qquad (12).$$

Application of the foregoing relationships in an analysis to calculate maintenance costs associated with the amount of a component's life used up will now be discussed. In accordance with a preferred embodiment, maintenance costing circuit 84" is programmed to apply the foregoing relationships to the measured values in turbine unit 18' by assuming that a maintenance cost M is incurred at failure of the component or unit. Thus, the fraction of the total cost M due to operation at a condition corresponding to environmental stressor $S_i$ at operating condition j is:

$$\text{Fractional cost}=l_{ij}M \qquad (13).$$

Similarly, the fractional maintenance cost per unit time $t_{ij}$ at the same operating conditions is:

$$\text{Fractional cost per unit time}=l_{ij}M/t_{ij} \qquad (14).$$

When equations (7) and then (6) are sequentially substituted into equation (14), this expression becomes:

$$\text{Fractional cost per unit time}=M/L_{ij} \qquad (15); \text{ and}$$

$$\text{Fractional cost per unit time}=M/\alpha_{ij}S_{ij}^{(-\beta_{ij})} \qquad (16).$$

To determine the values for $\alpha_{ij}$ and $\beta_{ij}$ at least two points must be known or approximated. In practice, the maintenance cost M and the typical unit or component lifetimes under "best" or "normal" conditions are generally derived from the experience of maintenance personnel, from statistical analysis of plant data, and from numerical simulations. Any of these approaches can be used to provide a "normal" operation maintenance data point. In addition, typical unit or component lifetimes under "extreme" conditions are generally derived from root-cause analyses of specific failure events and from on-line monitoring of operating data during failure events. This information can provide an "extreme" operation maintenance data point. The values for $\alpha_{ij}$ and $\beta_{ij}$ can be determined from these "normal" and "extreme" maintenance data points, using equation (6), by setting up a system of two such equations with two unknowns. The specifics of one such calculation are provided in the example discussed immediately below.

By way of example and not limitation, the following discussion applies the present technique to a vibration stressor that impacts the lifetime of a turbine guide bearing 110 in turbine 18' of facility 16' shown in FIG. 4. As will be appreciated by those skilled in the art, techniques for analysis of the impact of the vibration stressor on life expectancy of the turbine guide bearing discussed below are equally applicable to analysis of other stressors capable of influencing the lifetimes of other turbine components or the entire unit.

Referring again to FIG. 5, monitoring circuit modules 82' of controller 48' may include an efficiency module, a cavitation module, a vibration module, or any other similar routine for monitoring and evaluating operating parameters and/or stressors capable of affecting the life expectancy of turbine components or the entire unit. Based upon the monitored values, maintenance costing circuit 84" executes calculations of the associated impact on the life expectancy of the turbine component (e.g., turbine guide bearing 110) resulting from operation of facility 16 at the monitored conditions (e.g., current power level and operating head) subject to the monitored stressor (e.g., measured turbine guide bearing vibration in this example). More particularly, maintenance costing circuit 84" characterizes unit performance and stressors in the operating environment, and reports the amount of the life of the component or turbine used up by operation under the current conditions and stressors, the associated maintenance costs, and real-time maintenance cost per unit time based on current operating conditions and current energy/power values. Maintenance costing circuit 84" calculates this information using equation (16) and the time history.

Figure 9:
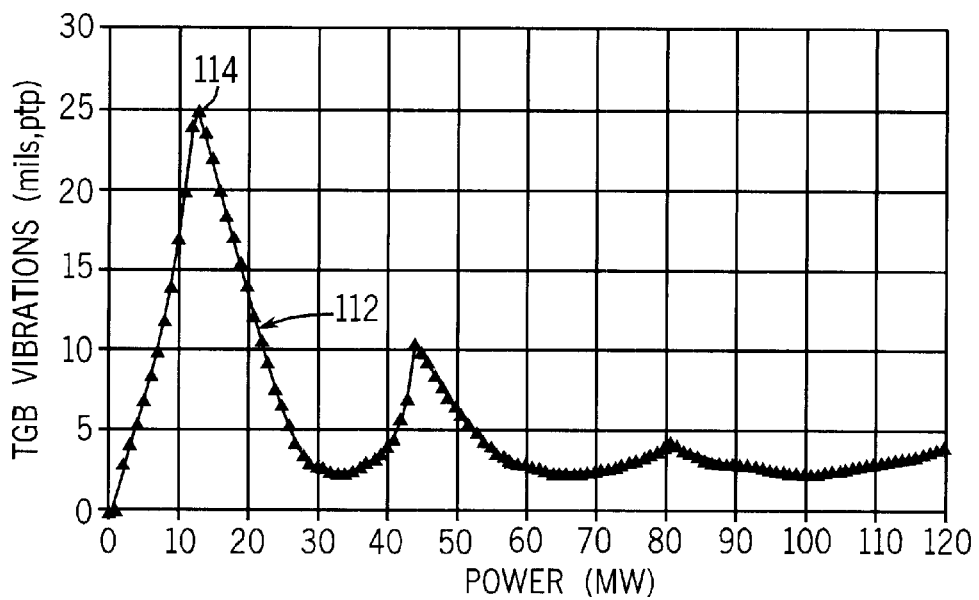
FIG. 9 is a graph showing turbine guide bearing vibrations from operating a three unit turbine facility, such as the one shown in FIG. 4, under varying operating conditions.

Turning now to FIG. 9, a curve 112 indicates the vibrations (as measured by a vibration sensor 64' shown in FIG. 4) in turbine guide bearings 110 as a function of power level for all three units 18' during normal operation over the entire operating range of facility 16'. As can be seen, curve 112 includes a large peak 114 at around 14 MW, which those skilled in the art will recognize is caused by a vortex in the draft tube. In the actual turbine facility from which the data were generated, a simplifying assumption was made that the operating head in facility 16' varies insignificantly throughout the year, and thus output power effectively represents the operating conditions. In addition, maintenance personnel report an expected life (mean time between failures) of twenty years (i.e., 175,200 hours) for continuous operation under the "best" conditions (i.e., lowest vibration of 2.3 mils). Based on previous experience with similar units, operation of the unit for ten (10) hours at a turbine guide bearing vibration of 50 mils resulted in bearing failure. (This monitored vibration resulting in bearing failure was caused by an unrelated fatigue failure in one of the turbine blades.) Using these "best" and "extreme" maintenance data points, equation (6) can be used to set up a system of two equations and two unknowns from which the values for α and β can easily be determined:

| TGB Vibration (mils, ptp) S | Life (hours) L | Proportionality Constant α | Exponent β |
|---|---|---|---|
| 2.3 | 175,200 | 2,462,761 | 3.1733 |
| 50 | 10 | 2,462,761 | 3.1733 |

Figure 10:
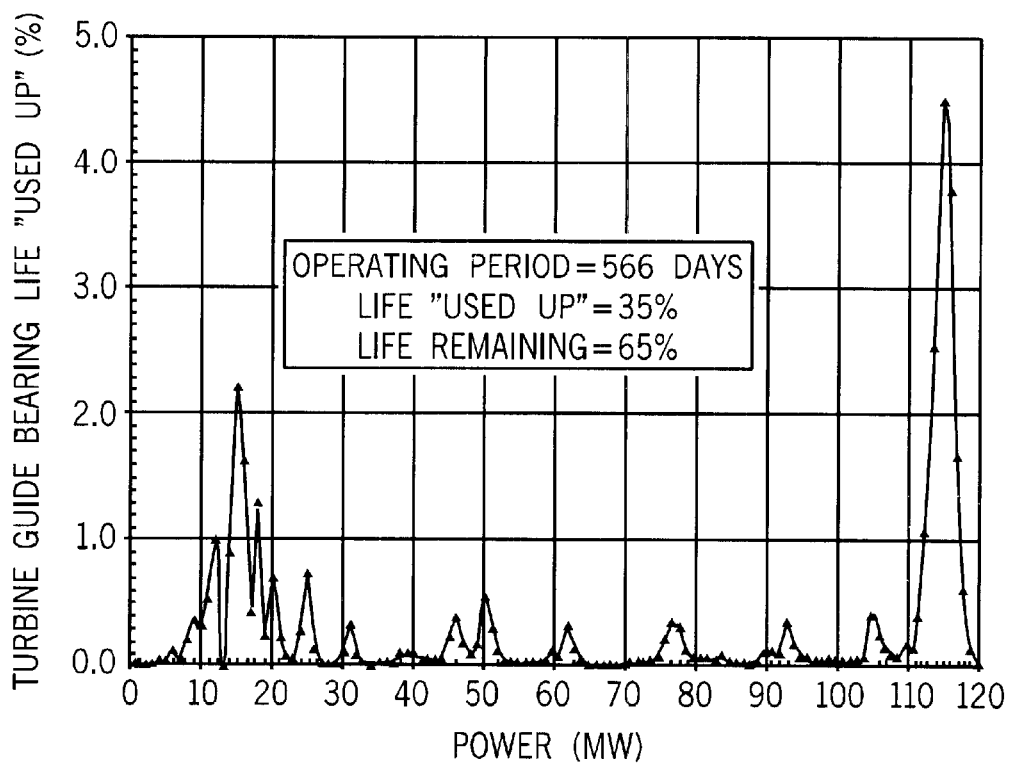
FIG. 10 is a graph showing percentage of turbine guide bearing life used up from operating the three unit turbine facility of FIG. 4 over a 566 day operating period under varying operating conditions.
Figure 11:
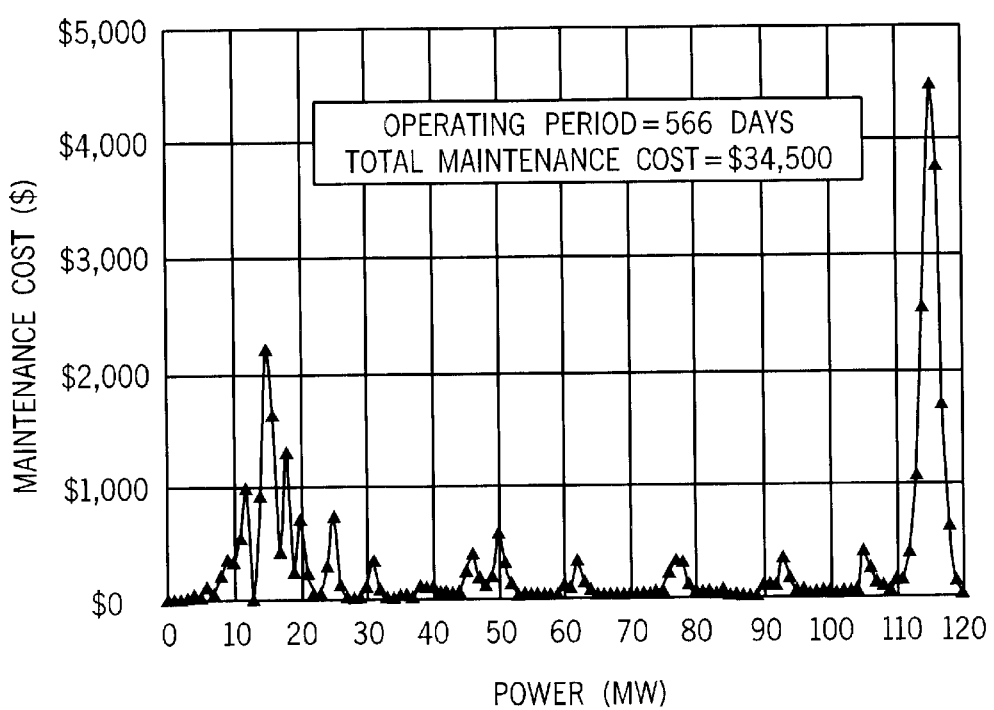
FIG. 11 is a graph showing a computation of total maintenance costs for turbine guide bearings, computed from turbine guide bearing vibrations, from operating the three unit turbine facility of FIG. 4 over a 566 day operating period.

Maintenance costing circuit 84" executes calculations using the turbine guide bearing vibration data shown in FIG. 9, the proportionality constant α and the exponent β shown above, hourly operating logs for a desired operating period (e.g., 566 days in this example), and equation (12) to determine the amount of the life of bearing 110 "used up" during the operating period. The result of these calculations can be seen in FIG. 10, which shows that during the 566-day operating period about 35% of the life of bearing 110 has been "used up," with much of the damage occurring in the economically attractive operating range between 110 MW and 120 MW. Maintenance costing circuit 84" also executes instructions to compute the maintenance cost over this 566-day operating period by using equation (13) (i.e., by taking the products of each percentage shown in FIG. 10 and the repair cost M). The repair cost M of repairing the turbine guide bearing in this example is about $100,000, and FIG. 11 shows the results of this calculation. As expected from the results of FIG. 9, it can be seen in FIG. 11 that most of the repair costs are incurred during operation in the economically attractive operating range between 110 MW and 120 MW.

Thus, it can be seen that the foregoing provides a theoretical and practical basis for predicting what the life of a generating unit or component is going to be based on objectively measurable parameters. This information can then be used by plant personnel to change the way maintenance is done, namely, to monitor when a certain fraction of an item's life has been used up by actual operation and base the maintenance on that information, rather than using a time-based maintenance or reliability-centered maintenance approach, both of which fail to account for actual operating conditions. The information on real-time maintenance cost per unit time, based on current operating conditions and current energy/power values, and the information on environmental costs due to efficiency losses, based on current operating conditions and current energy/power values, has great value in real-time optimization of economic benefits from operation of a hydroelectric facility.

When fully implemented, the present system can evaluate the expected life of hydro equipment and components under varying operating conditions, quantify the effects of operating conditions on maintenance costs, provide real-time maintenance costs associated with current operating conditions for use in optimizing operations, facilitate condition-based maintenance by tracking the "remaining life" in equipment and components, and provide quantitative information for use in defining avoidance zones. Hence, the present maintenance cost estimation technique will be a useful tool for developing operations-based maintenance and operations-based maintenance budgets and for ensuring that the maintenance implications of hydro operations are adequately addressed.

Numerous characteristics, advantages, and embodiments of the invention have been described in detail in the foregoing description with reference to the accompanying drawings. However, the disclosure is illustrative only and the invention is not limited to the precise illustrated and described embodiments. Various changes and modifications may be effected by one skilled in the art without departing from the scope or spirit of the present invention. For example, although the foregoing example used vibration as an indication of bearing life, those skilled in the art will recognize that more generally an inefficiency parameter can be used as an overall indication of the health of the entire hydroelectric plant, and that this information can be used as a basis for maintenance. Similarly, although only two points were used to derive α and β in the life expectancy equation, it should be understood this gives only a starting point useful for evaluating and optimizing, and that as more data is gathered over time the model can be refined (i.e., multiple points can be used to further refine α and β or even solve for best fit). Hence, the scope of the present invention is to be limited only by the scope of the claims which follow.

What is claimed is:

1. A method for monitoring maintenance information in a hydroelectric power generation facility including at least one generating unit having turbine and generator components, the method comprising the steps of:

monitoring at least one operating parameter continuously over an operating period at an operating condition, the at least one parameter including a stressor capable of affecting a life span, or mean time between failures, of the generating unit or one of its components;

calculating the amount of the life span used up at the operating condition subject to the stressor for the operating period; and deriving a maintenance cost from the amount of the life span of the component or generating unit used up.

2. The method of claim 1, further comprising the step of reporting the amount of the life span used up to local or off-site personnel or systems.

3. The method of claim 1, wherein the monitored operating period is unit time.

4. The method of claim 1, wherein the monitored operating period is a multiple of unit time.

5. The method of claim 1, wherein the stressor comprises at least one of vibration level, cavitation intensity, seal clearance, seal leakage, hydraulic inefficiency, measured mechanical stress, calculated mechanical stress, bearing loading, bearing temperature, bearing oil quality, and bearing oil quantity.

6. A method for monitoring maintenance information in a hydroelectric power generation facility including at least one generating unit having turbine and generator components, the method comprising the steps of:

monitoring at least one operating parameter continuously over an operating period at an operating condition, the at least one parameter including a stressor capable of affecting a life span, or mean time between failures, of the generating unit or one of its components; and calculating the amount of the life span used up at the operating condition subject to the stressor for the operating period, wherein the amount of the life span used up is calculated in accordance with the following relationship:

$$R(\text{in \%}) = 100(1 - \Sigma(t_{ij}/\alpha_{ij} S_{ij}^{(-\beta_{ij})}));$$

where R is the remaining life of the component or generating unit under consideration, $S_{ij}$ is the effect of the stressor at the operating condition, $t_{ij}$ is the duration of the operating period under the effects of the stressor at the operating condition, $\alpha_{ij}$ is a constant of proportionality, and the exponent $\beta_{ij}$ is a numerical constant.

7. The method of claim 6, wherein the constants $\alpha$ and $\beta$ are derived by solving a system of two equations in accordance with the following relationship:

$$L = \alpha S^{(-\beta)}$$

where L is the life expectancy of the turbine or component under consideration and S is the stressor being monitored.

8. The method of claim 7, wherein the values for L and S for the two equations are derived from a normal and an extreme operating condition.

9. The method of claim 8, wherein the values for L and S for the normal operating condition are derived from experience of maintenance personnel, from statistical analysis of plant data, or from numerical simulations.

10. The method of claim 8, wherein the values of L and S for the extreme operating condition are derived from root-cause analyses of specific failure events or from on-line monitoring of operating data during failure events.

11. A method for monitoring maintenance information in a hydroelectric power generation facility including at least one generating unit having turbine and generator components, the method comprising the steps of:
monitoring at least one operating parameter continuously over an operating period at an operating condition, the at least one parameter including a stressor capable of affecting a life span, or mean time between failures, of the generating unit or one of its components; and
calculating the amount of the life span used up at the operating condition subject to the stressor for the operating period,
further comprising the step of deriving a maintenance cost from the amount of the life span of the component or generating unit used up, wherein the maintenance cost is derived in accordance with the following relationship:

$$\text{total maintenance cost} = t_{ij} M / \alpha_{ij} S_{ij}^{(-\beta_{ij})};$$

where $t_{ij}$ is the duration of the operating period, M is the estimated maintenance cost for repairing the component or generating unit under consideration, $S_{ij}$ is the effect of the stressor at the operating condition, $\alpha_{ij}$ is a constant of proportionality, and the exponent $\beta_{ij}$ is a numerical constant.

12. A system for monitoring maintenance information in a hydroelectric power generation facility including at least one generating unit having turbine and generator components, the system comprising:
at least one sensor, the at least one sensor being situated in the facility to detect actual levels of at least one operating parameter for a desired operating period at an operating condition, the at least one parameter including a stressor capable of affecting a life span, or mean time between failures, of the generating unit or one of its components; and
a controller coupled to the at least one sensor, the controller determining the amount of the life span used up at the operating condition subject to the stressor for the operating period,
wherein the controller is programmed to derive a maintenance cost from the amount of the life span of the component or generating unit used up.

13. The system of claim 12, wherein the controller includes a programmed computer.

14. The system of claim 12, further comprising an operator interface coupled to the controller, the controller displaying on the operator interface idicia representative of the life span used up.

15. A system for monitoring maintenance information in a hydroelectric power generation facility including at least one generating unit having turbine and generator components, the system comprising:
at least one sensor, the at least one sensor being situated in the facility to detect actual levels of at least one operating parameter for a desired operating period at an operating condition, the at least one parameter including a stressor capable of affecting a life span, or mean time between failures, of the generating unit or one of its components; and
a controller coupled to the at least one sensor, the controller determining the amount of the life span used up at the operating condition subject to the stressor for the operating period,
wherein the controller includes a programmed computer that is programmed to determine the amount of the life span used up in accordance with the following relationship:

$$R(\text{in } \%) = 100(1 - \Sigma(t_{ij}/\alpha_{ij} S_{ij}^{(-\beta_{ij})}));$$

where R is the remaining life of the component or generating unit under consideration, $S_{ij}$ is the effect of the stressor at the operating condition, $t_{ij}$ is the duration of the operating period under the effects of the stressor at the operating condition, $\alpha_{ij}$ is a constant of proportionality, and the exponent $\beta_{ij}$ is a numerical constant.

16. A method for monitoring losses in a hydroelectric power generation facility, the facility capable of operating to satisfy environmental constraints, the method comprising the steps of:
storing in a memory circuit a set of predetermined reference signals representative of desired turbine efficiencies over a range of operating levels;
operating the facility to satisfy the environmental constraints;
sensing current levels of operating parameters while the facility is operating to satisfy the environmental constraints;
generating a sensed parameter signal from the sensed levels of operating parameters representative of a current turbine efficiency;
comparing the generated parameter signal to the predetermined reference signals to determine an environmental efficiency loss signal.

17. The method of claim 16, wherein the predetermined reference signals are derived by operating the facility without attempting to satisfy the environmental constraints and sensing a plurality of operating parameters at each operating level from which turbine efficiency is calculable.

18. The method of claim 17, wherein the plurality of operating parameters include at least power generation level, flow rate through the facility, and head across the facility.

19. The method of claim 16, wherein the predetermined reference signals are derived by model testing.

20. The method of claim 16, wherein the turbine efficiency at each operating level is represented by a set of operating parameters including at least power generation level, flow rate through the facility, and head across the facility.

21. The method of claim 20, wherein the set of predetermined reference signals is stored in an N-dimensional array, where N is the total number of operating parameters.

22. The method of claim 21, wherein the environmental constraint involves supplying an oxygen containing gas to water flowing through the facility to enhance a level of dissolved oxygen in the water.

23. The method of claim 16, further comprising the step of applying an economic cost factor to the environmental efficiency loss signal to generate an economic cost estimate value, the economic cost estimate value representing an additional economic cost of operation of the facility to satisfy the environmental constraints.

24. The method of claim 23, wherein the economic cost estimate value is calculated by taking the product of the environmental efficiency loss, facility power level, number of time units of operation, and a cost of energy per time unit.

25. The method of claim 23, wherein the economic cost factor includes a unitized market value for energy produced by the facility.

26. The method of claim 23, wherein the economic cost factor is accessed from an external data source through a communications link at the facility.

27. The method of claim 23, wherein the economic cost factor is an average value for energy produced by the facility over a predetermined historical period.

* * * * *